United States Patent
Bansal et al.

(12)

(10) Patent No.: US 6,263,063 B1
(45) Date of Patent: Jul. 17, 2001

(54) SYSTEM AND METHOD FOR PROVISIONING AN EXTRA LINE ON DEMAND AND FOR SELECTIVELY CONNECTING CALLS WITH A PLURALITY OF DEVICES

(75) Inventors: Pradeep K. Bansal, Dayton; Lee Begeja, Gillette, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/219,225

(22) Filed: Dec. 23, 1998

(51) Int. Cl.[7] .............................. H04M 1/00; H04M 9/00; H04M 13/00
(52) U.S. Cl. .................. 379/164; 379/165; 379/171; 379/173; 379/177
(58) Field of Search .................... 379/127, 142, 379/157, 156, 177, 164, 179, 161, 159, 160, 211, 215, 167, 165, 201; 455/445, 432, 433, 436

(56) References Cited

U.S. PATENT DOCUMENTS

| | | | |
|---|---|---|---|
| 4,813,065 | * 3/1989 | Segala | 379/130 |
| 5,590,184 | * 12/1996 | Norman et al. | 379/142 |
| 5,623,537 | * 4/1997 | Ensor et al. | 379/142 |
| 5,625,680 | * 4/1997 | Foladare et al. | 379/127 |
| 5,724,658 | * 3/1998 | Hasan | 455/445 |
| 5,748,718 | * 5/1998 | Manicone | 379/142 |
| 5,883,944 | * 3/1999 | Burke et al. | 379/159 |
| 5,887,054 | * 3/1999 | Burket et al. | 379/159 |
| 5,991,387 | * 11/1999 | Shaffer et al. | 379/211 |
| 6,044,403 | * 3/2000 | Gerszberg et al. | 709/225 |
| 6,055,305 | * 4/2000 | Norman et al. | 379/210 |

* cited by examiner

Primary Examiner—Curtis Kuntz
Assistant Examiner—Rexford N Barnie (57) ABSTRACT

A network interface device that allows a user to simultaneously receive/send a plurality of calls from/to a telecommunications network by multiplexing/demultiplexing the calls on a single telephone line. The network interface device allows for the provisioning of an extra line on demand to the user for incoming and outgoing purposes. The network interface device further selectively connects the calls with a plurality of devices in accordance with each devices availability and the stored preferences of the party receiving the call. When a call ends, the network interface device terminates the temporary virtual line assignment.

38 Claims, 5 Drawing Sheets

|  | 202 | 204 | 206 | 208 | 210 |  | 212 |  |
|---|---|---|---|---|---|---|---|---|
| 220 → | 1 | BUSY | 703-526-0625 | 703-526-0625 1 | 713-727-4186 3 | . . . | 1 | ... |
| 222 → | 2 | FREE | – | 215-725-2725 1 | 713-727-4186 2 | . . . | 2 | |
| 224 → | 3 | BUSY | 212-825-6794 | 703-526-0625 2 | 816-261-1122 1 | . . . | 3 | |

|  | 202 | 204 | 206 | 208 | 210 |  | 212 |  |
|---|---|---|---|---|---|---|---|---|
| 226 → | 14 | FREE | – | 703-335-6125 1 | 215-725-8878 2 | . . . | 3 | ... |
| 228 → | 15 | FREE | – | 215-725-8878 1 | 703-335-6125 2 | . . . | 1 | ... |
| 230 → | 16 | BUSY | 916-277-6287 | 916-277-6287 1 | 215-725-8878 3 | . . . | 2 | ... |

SYSTEM AND METHOD FOR PROVISIONING AN EXTRA LINE ON DEMAND AND FOR SELECTIVELY CONNECTING CALLS WITH A PLURALITY OF DEVICES

BACKGROUND OF THE INVENTION

1. Field of Invention

The invention relates to the field of communications, and more particularly, to the selective connection of a plurality of calls from a telephone network to a plurality of devices of a called party in accordance with that party's preferences, in addition to provisioning extra lines on demand for use by that party.

2. Description of the Related Art

Telephone system subscribers that have a single telephone line connection are often in a situation where they are on the phone with a first party when another call from a second party is received. If call waiting is available, the subscriber may choose to engage with one of the two parties and place the other party on hold. The subscriber is forced to select one of the two parties even when the second party desires to converse with someone other than the subscriber or is an incoming facsimile directed to a facsimile machine. Therefore, there is a need for new technology to resolve the above problems.

SUMMARY OF THE INVENTION

The invention provides a network interface device (NID) that selectively connects a plurality of calls from a single telephone line of a communication network to a plurality of devices. A mux-demux device multiplexes calls received from the communication network and transmits multiplexed calls to the NID and the NID demultiplexes the calls received from the mux-demux device and forwards the demultiplexed calls to the devices. The NID multiplexes communication signals corresponding to the calls received from the devices onto the single telephone line and the mux-demux device demultiplexes the multiplexed communication signals and forwards the demultiplexed communication signals to the communication network.

When the calls are received, the NID retrieves a profile from a database and connects the calls to one or more of the devices based on the profile. The devices are connected to the NID either via a star configuration where each of the devices has a unique line, via tap configuration where all the devices tap off a single line, or a combination of both. In the star configuration, the NID switches calls to the corresponding devices; for the single line tap configuration, the NID sets up channels on the single line and forwards calls to the devices via uniquely assigned channels; for the hybrid situation, the NID performs a combination of switching and channel assignment techniques. Thus, the NID supports multiple simultaneous calls to the devices via the single telephone line.

The invention also provides an NID that dynamically provisions extra lines over a single telephone line of a communications network to a plurality of devices. The NID multiplexes the additional calls over the single telephone line to the mux-demux device where the calls are demultiplexed, sent to the communication network and routed to respective locations.

BRIEF DESCRIPTION OF THE DRAWINGS

The invention will be described with reference to the accompanying drawings, in which like elements are referred to with like numbers, and in which.

DETAILED DESCRIPTION OF PREFERRED EMBODIMENTS

Figure 1:
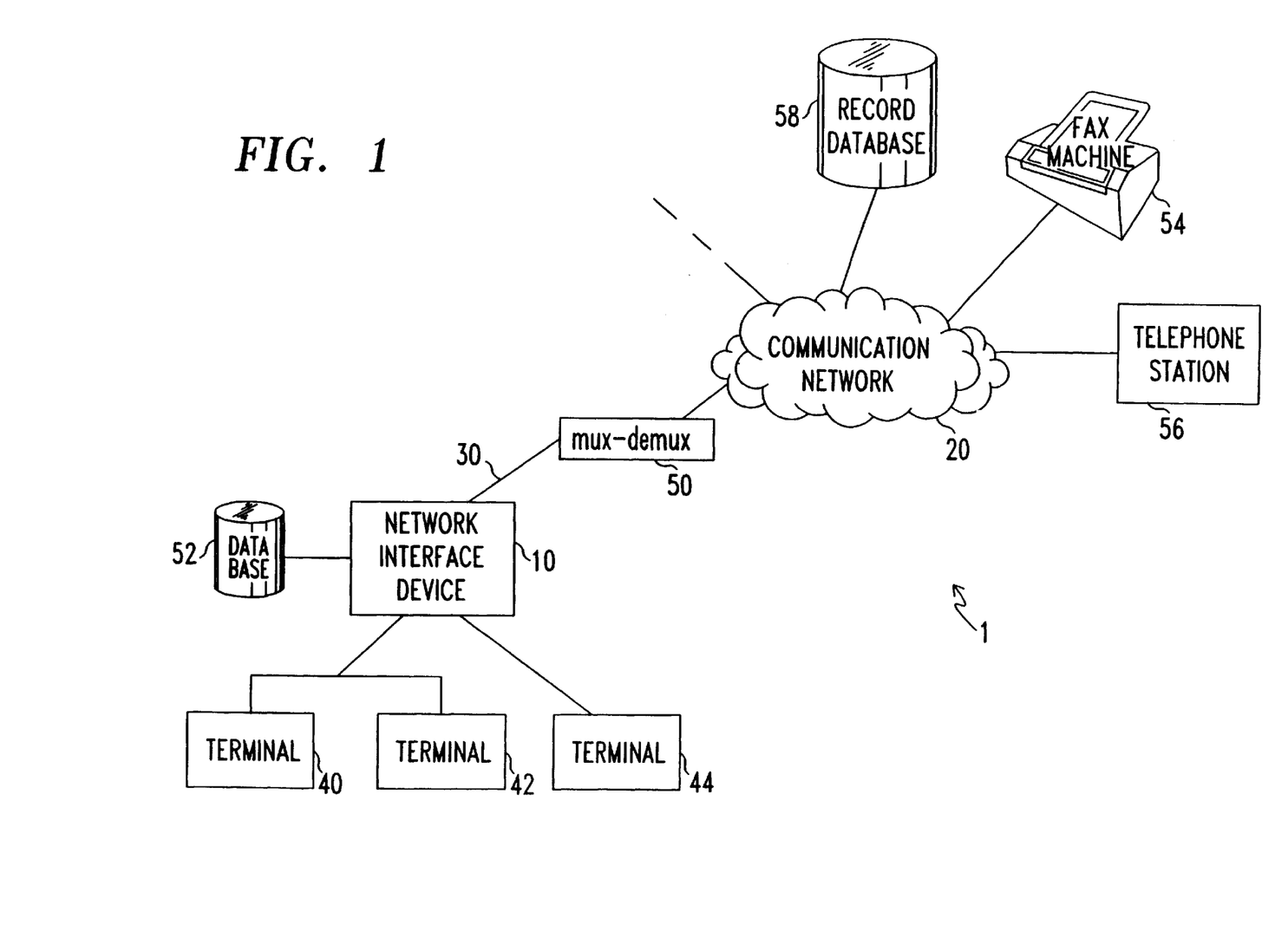
FIG. 1 is a block diagram of an exemplary network interfacing system.

FIG. 1 shows a communication system 1 that includes a communications network 20, a network interface device (NID) 10 coupled to the communication network 20 via a single telephone line 30 and a mux-demux device 50. The NID 10 is further connected to a plurality of terminal devices 40, 42, 44 and capable of selectively connecting a plurality of calls received from the communications network 20 with the plurality of terminals 40, 42, 44.

The terminals 40–44 may be connected to the NID 10 by various topologies. For example, the terminals 40–44 may be connected to the NID 10 in a "star" configuration where each of the terminals 40–44 are connected to the NID 10 by a unique line. Alternatively, the terminals 40–44 may be connected via a single line where each of the terminals 40–44 "tap" off the single line. The two connection methods may be mixed as shown in FIG. 1 where terminals 40 and 42 tap off a single line while terminal 44 is connected via a unique line.

The NID 10 may engage multiple terminals 40–44 in independent calls by setting up a routing path for each of the calls to their respective terminals 40–44. If the terminals 40–44 are connected in a star configuration, then the NID 10 acts like a switch where respective calls are switched to their corresponding terminals. If the terminals 40–44 are connected in a tap configuration, then the NID 10 may generate channels on the single line by using available modem transmission techniques. Each of the terminals 40–44 on the tap single line also include modems so that the NID may assign a unique channel to appropriate terminals 40–44 and transmit calls through the assigned channels to the terminals. If some of the terminals 40–44 have unique lines while others are connected by a single line, the NID 10 may switch calls to those terminals 40–44 on unique lines and channelize the single tap line. In this way, any number of terminals 40–44 may communicate concurrently with calls with other parties through the communication network 20.

When a first call is received over the telephone line 30 from the communications network 20, the NID 10 routes the call to one of the terminals 40–44, in accordance with a profile stored in a database 52 or on the communication network 20 at record 58. If during the duration of the call, another call is received, the NID 10 routes the second call to another one of the terminals 40–44 based on availability of the terminals 40–44 and the profile stored in the database 52. Similarly as above, the NID 10 may handle any number of calls.

The mux-demux device 50 multiplexes the calls on the telephone line 30 by using multiplexing methods such as frequency multiplexing, time division multiplexing, etc. The number of calls that may be multiplexed on the telephone line 30 depends on the actual transmission medium (e.g., twisted pair, coaxial cable, optic fiber, etc.) and the transmit/ receive technology. Currently, T1 line transmission rates are possible over twisted pairs, for example. Thus, the communications network 20 may route numerous calls onto the single line 30 through the mux-demux device 50.

Once the multiplexed calls are received from the telephone line 30, the NID 10 demultiplexes the calls and sends each of the calls to corresponding terminals 40–44 as determined by the terminal selection process when calls were initially received. When a call is completed, the NID 10 updates the database 52 to indicate that the terminal 40–44 connected to the completed call is free to receive another call and any routing of the call may be "taken down".

The NID 10 also receives calls originating from one or more of the terminals 40–44. When a call is received, the NID 10 multiplexes the call onto the telephone line 30 so that the call may be sent to the communication network 20 to be processed. Thus, the NID 10 may support multiple calls to and from the communication network 20 under a single telephone number that corresponds tot he telephone line 30.

Figure 2:
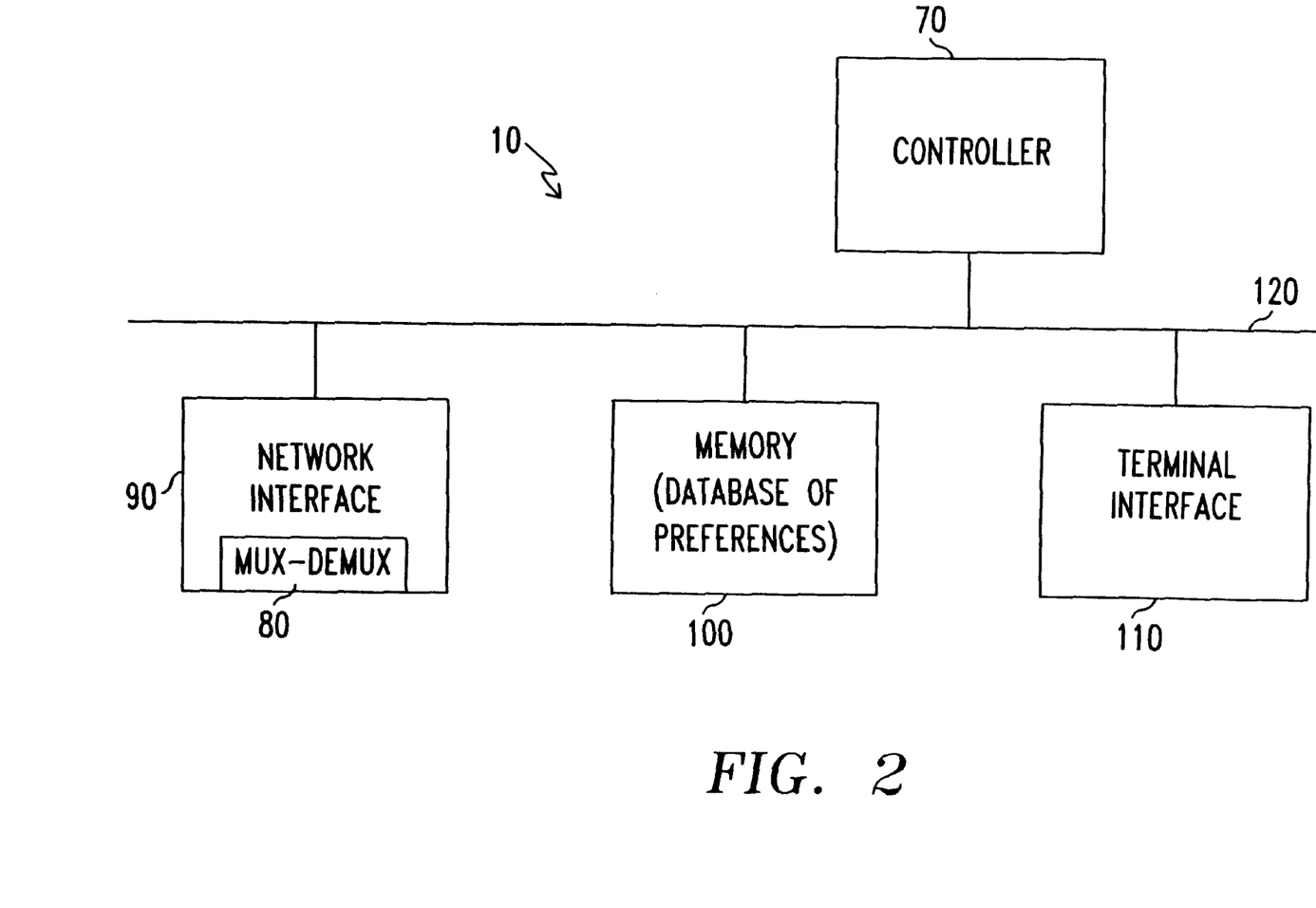
FIG. 2 is a block diagram of the network interface device.

FIG. 2 is a block diagram of the NID 10. The NID 10 may include a controller 70, a network interface 90 that includes a mux-demux device 80, a memory 100, and a terminal interface 110. The above components are coupled together via signal bus 120. The above architecture is exemplary only. Other architectures which are well known in the art may be used to accomplish the same purposes.

The mux-demux device 80 is coupled to the telephone line 30 and transmits and receives multiplexed signals to and from the mux-demux device 50, respectively. Signals receives from the telephone line 30 are demultiplexed and processed while signals received from the terminals 40–44 via the terminal interface 110 are multiplexed and transmitted to the mux-demux device 50.

When a call is first received, the network interface 90 transmits a message via the signal bus 120 to the controller 70 to indicate that a new call has been received. The message may include information such as the calling party telephone number, the type of transmission (i.e., voice, facsimile; and data network), etc. In response, the controller 70 retrieves the profile from the memory 100 and, based on the profile, selects one of the terminals 40–44 not already engaged in a call. The profile from memory 100 may be stored in database 52 alone, or in record database 58. Both databases 52, 58 may store identical data and communicate with each other through the communication network 58. The controller 70 relays this selection information via the bus 120 to the terminal interface 110, which then connects the call with the selected terminal 40–44.

Figure 3:
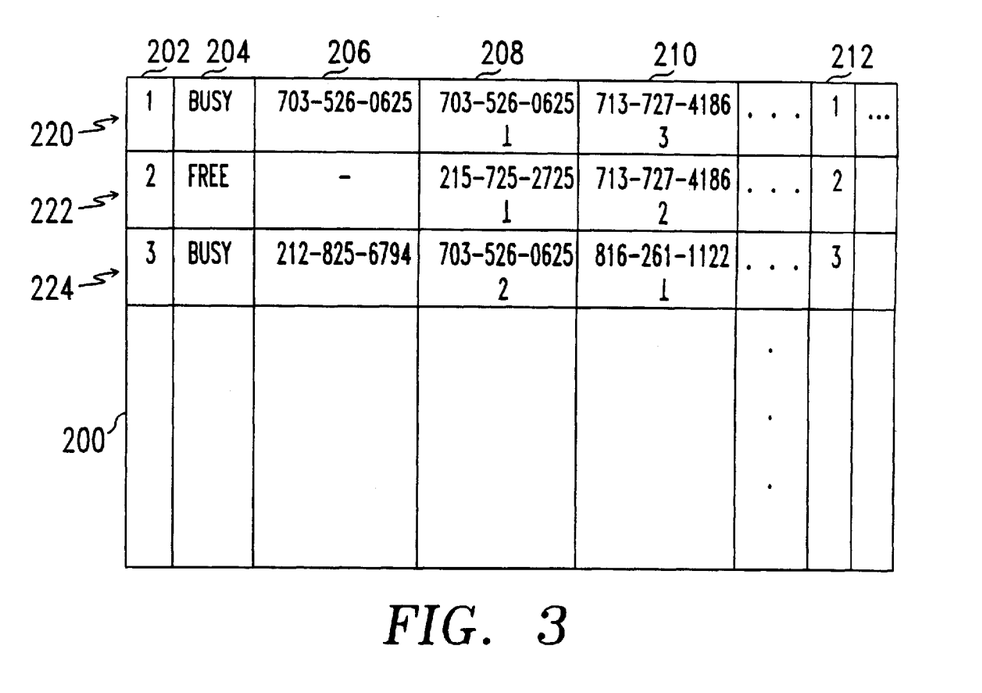
FIGS. 3 and 4 are tables representing possible formats of storing profile information for voice and data calls, respectively.
Figure 4:
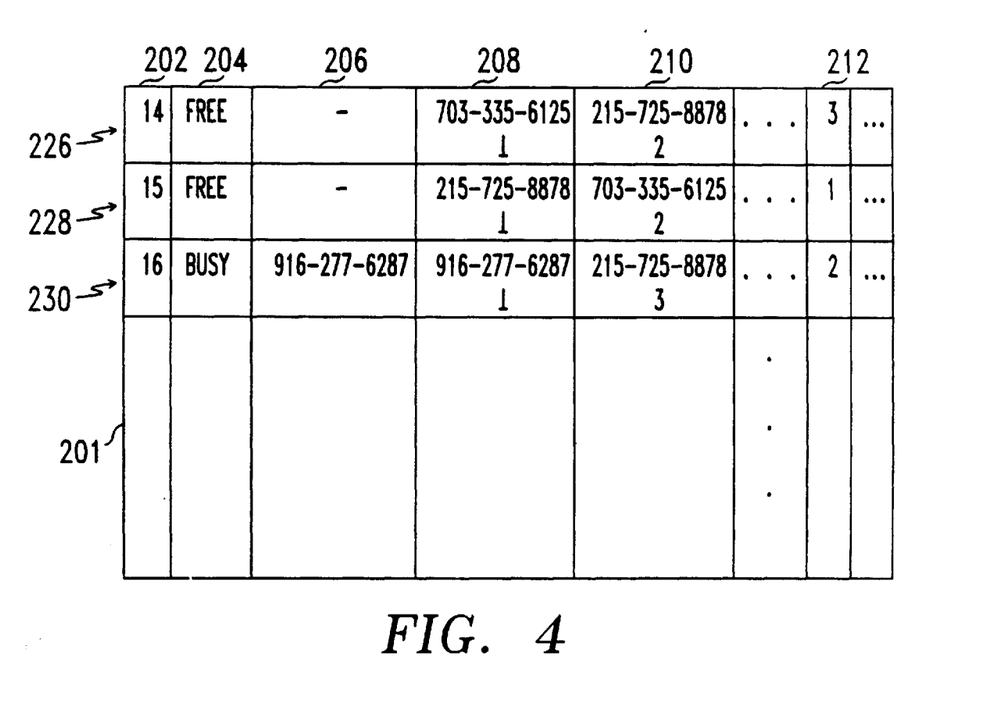

FIGS. 3 and 4 show exemplary formats for the profile corresponding to voice and data calls, respectively. Additional tables may be added for further distinctions such as Internet calls and facsimile calls. While FIGS. 3 and 4 shows separate tables, a single table may be used because the type of call may be indicated by a field. However, separate tables are illustrated for ease of discussion.

Each of the terminals 40–44 may have a different priority for different calling telephone numbers. For example, if the number 703-526-0625 is the telephone number of a father's friend while 215-725-2725 is the telephone number of a daughter's boyfriend and terminals 1 and 2 are the father's and the daughter's telephones, respectively, then the table 200 routes the father's friend to the father's telephone station and the daughter's boyfriend to the daughter's telephone station. Thus, the preferences permit efficient routing of incoming calls.

The tables 200 and 201 include entries 220–230. Each of the entries 220–230 include fields 202–212 that indicate specific information relating to each of the corresponding terminals 40–44. A terminal 40–44 may appear as entries in either one or both tables 200 and 201. For example, a personal computer that has a fax-modem card and a telephone card may receive both data and voice. Depending on the technology, the personal computer may have the capability to determine which card is to receive the incoming call. In addition, each terminal 40–44 may have the ability to handle multiple calls.

The field 202 may contain addresses of the terminals 40–44 corresponding to each entry 220–230. The field 204 may contain a current status of the corresponding terminal 40–44 such as busy, not functioning, etc., for example. The field 204 may be updated as calls are received and completed. The field 206 stores a telephone number of the party who is currently engaged with the respective terminal 40–44. For example, the terminal 40–44 at address 15 is engaged in a call with a party at 703-526-0625; and the terminal 40–44 at address 3 is engaged in a call with a party at 212-825-6794. The terminal at address 2 is not engaged in a call and thus the field 204 indicates "free" and the field 206 is empty.

The fields 208–212 contain priority preferences. For example, the NID 10 would attempt to route a call originating from the telephone number 703-526-0625 to the terminal 40–44 at address 1. However, if that terminal 40–44 is busy, as depicted in table 200, the NID 10 would then attempt to route the call to the terminal 40–44 at address 3, as shown in the field 208. The field 212 contains default priorities that direct which of the terminals 40–44 should receive the calls if the call's telephone number is not listed in any of the other priority fields 208 or 210.

The tables 200 and 202 may direct an incoming call to a plurality of devices simultaneously. For example, all terminals 40–44 on the premise may ring when a call is received from an emergency telephone number.

The mux-demux 80 within the network interface 90 may be in constant communication with the mux-demux device 50. Thus, as calls are transmitted by the mux-demux 50, the mux-demux 80 receives the calls and demultiplexes the calls so that each of the calls received may be routed independently of each other. For each call that is received, the network interface 90 may send a message to the controller 70 to indicate that the calls are received. When the controller 70 receives the message, the controller 70 may retrieve an assignment table from a database such as the database 52 to determine whether the call has been previously assigned to one of the terminals 40–44. If such an assignment is found, the controller 70 may instruct the network interface 90 to send the call information to the terminal interface 110 to route the call to the assigned terminal 40–44.

The network interface 90 and the terminal interface 110 may also include capabilities to process the calls independently. For example, the controller 70 may set parameters in the network interface 90 and the terminal interface 110 after initially assigning a call to a particular terminal 40–44. Thus, when a call is received, the network interface 90 may first determine whether the call has already been assigned to one of the terminals 40–44 based on the parameters set by the controller 70. If the call has been assigned, the network interface 90 may send the call information to the terminal interface 110 directly without sending the message to the controller 70. In this way, calls that are already assigned may be routed directly to the respective terminals 40–44 without further processing by the controller 70.

If a call has not already been assigned, the controller 70 retrieves the profile from the database 52 and determines whether a highest priority corresponding to the telephone number of the calling party (obtained via automatic number identification, for example) is available to receive the call. If the highest priority terminal is available to receive the call, the controller 70 assigns the call to the highest priority terminal and instructs the network interface 90 and the terminal interface 110 to route the call accordingly. If the highest priority terminal is already engaged in a call, the controller 70 further searches the profile to determine a next highest priority terminal. The above process continues until there are no terminals 40–44 remaining to receive the call.

The profile may also include information regarding features that are supported by the NID 10. For example, the NID 10 may support call waiting and voice mail, for example. In such cases, when all the terminals that are indicated by the profile to be capable of handling a particular call is already engaged in a call, the controller 70 may apply these other additional features. For example, if none of the terminals 40–44 can handle a call, the controller 70 may place the call on call waiting for a selected terminal 40–44. The profile entries may have an additional field indicating the priority for each of the terminals to support call waiting, for example. Thus, the controller 70 may search the profile until a terminal 40–44 is found that may support call waiting for this particular call.

If voice mail is available and the profile indicates that a particular call should be received by voice mail if none of the terminals 40–44 are available to engage the call, the controller 70 routes the call to the voice mail functions which may output a message to invite the caller to leave a message. Thus, the NID 10 may take full advantage of all available telephone features and support them locally for a particular premise such as a home or an office. In addition, because multiple terminals 40–44 may be permitted to engage in calls concurrently, each of the terminals 40–44 may also receive call waiting, and thus, the NID 10 may support multiple call waitings and voice mail at the same time.

The table 202 functions in an identical manner as the table 200, except the entries 226–230 in table 202 correspond to terminals 40–44 which receive only incoming data calls. In other words, devices such as facsimile machines and computer terminals have addresses 14–16.

The controller 70 (or the terminal interface 110 if so capable) may receive calls originating from any one of the terminals 40–44. If the star configuration is used, then a call from a terminal 40–44 is received directly via the dedicated line for that terminal 40–44. If the single tap line is used, the controller 70 may set up multiple channels over the single tap line via the terminal interface 110. For example, the terminal interface 110 may support T1 bandwidth over a single twisted pair of 1.544 megabits per second (mb/s). This bandwidth may support up to 24 64 kilo bits per second (kb/s) bandwidth of conventional telephone lines, for example. Thus, the controller 70 may allocate one of the 64 kb/s channels to the terminal 40–44 that requests to originate a call to parties external to the NID 10.

The controller 70 may allocate two of the channels for an upstream control channel and downstream control channel. In this way, when a call is to be made, the terminals 40–44 may send a channel request to the controller 70 and the controller 70 may allocate an available channel, assign the available channel to the requesting terminal, and send the allocation to the requesting terminal via the downstream control channel. The channel assignment may be recorded in a channel assignment database and processed as discussed above for supporting the call.

Figure 5:
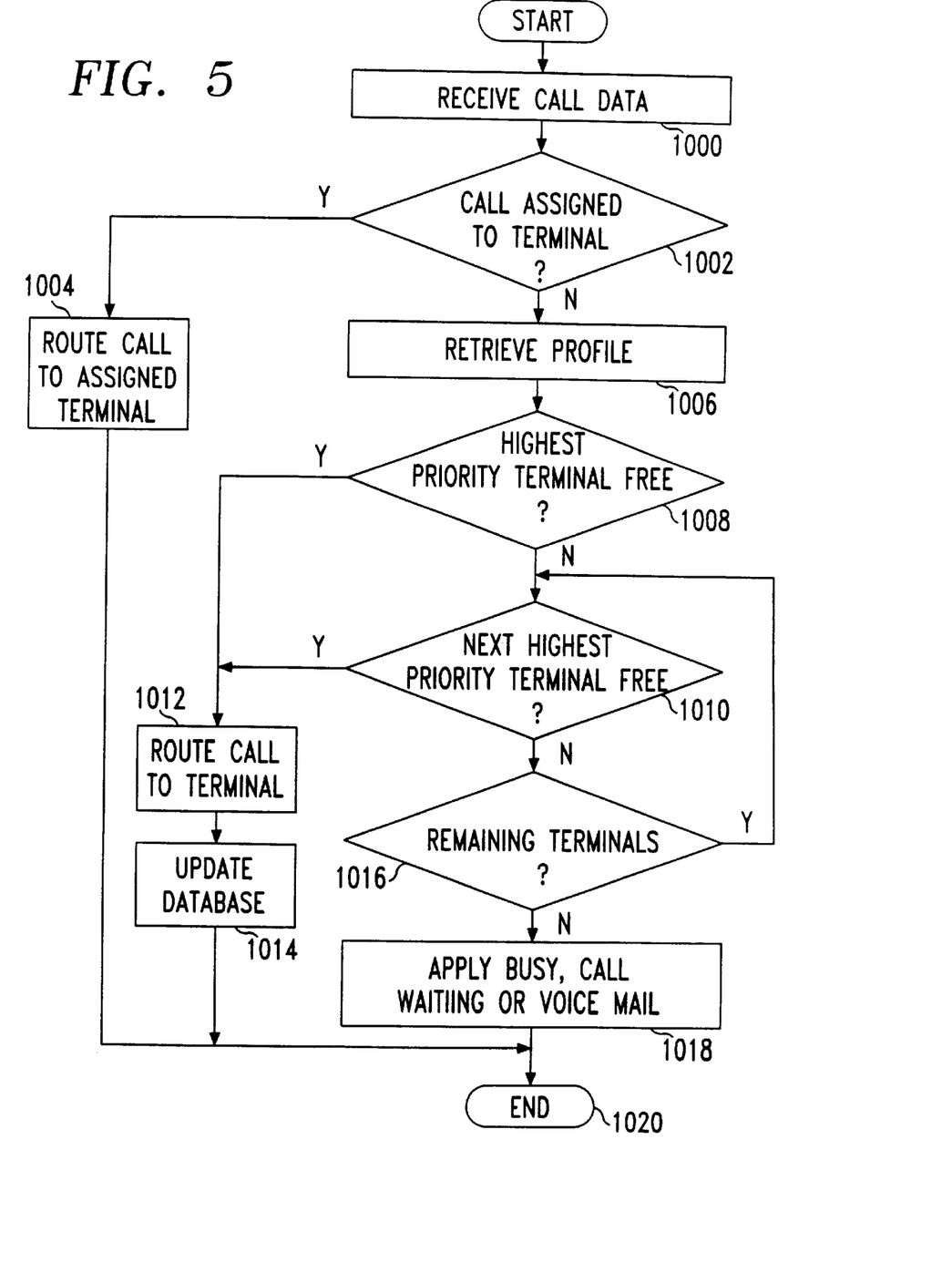
FIG. 5 is a flowchart of a network interface device process for incoming calls.

FIG. 5 shows a flowchart of a process of the NID 10 for incoming calls. In step 1000, the controller 70 receives call data from the network interface 90 and goes to step 1002. In step 1002, the controller 70 determines whether the call has been assigned to a terminal 40–44 based on prior call assignments. If the call has been assigned to a terminal, the controller 70 goes to step 1004; otherwise, the controller goes to step 1006. In step 1004, the controller routes the call to the assigned terminal via the terminal interface 110 and goes to step 1020 to end the process.

In step 1006, the controller 70 retrieves the profile from the database 52 and goes to step 1008. In step 1008, the controller 70 determines whether the highest priority terminal is free to receive the call. If free, the controller 70 goes to step 1012; otherwise, the controller goes to step 1010. In step 1012, the controller routes the call to the terminal of the highest priority and goes to step 1014. In step 1014, the controller updates the database and the terminal assignment table and goes to step 1020 to end the process.

In step 1010, the controller 70 determines whether the next higher priority terminal is free. If the next higher priority terminal is free, the controller 70 goes to step 1012; otherwise, the controller goes to step 1016. In step 1016, the controller 70 determines whether there are any remaining terminals that may receive the call. If no remaining terminals are available, the controller 70 goes to step 1018; otherwise, the controller returns to step 1010. In step 1018, the controller determines whether the subscriber has any other additional features such as call waiting or voice mail. If none of these features are available, the controller 70 returns a busy signal to the communication network and goes to step 1020 to end the process.

Figure 6:
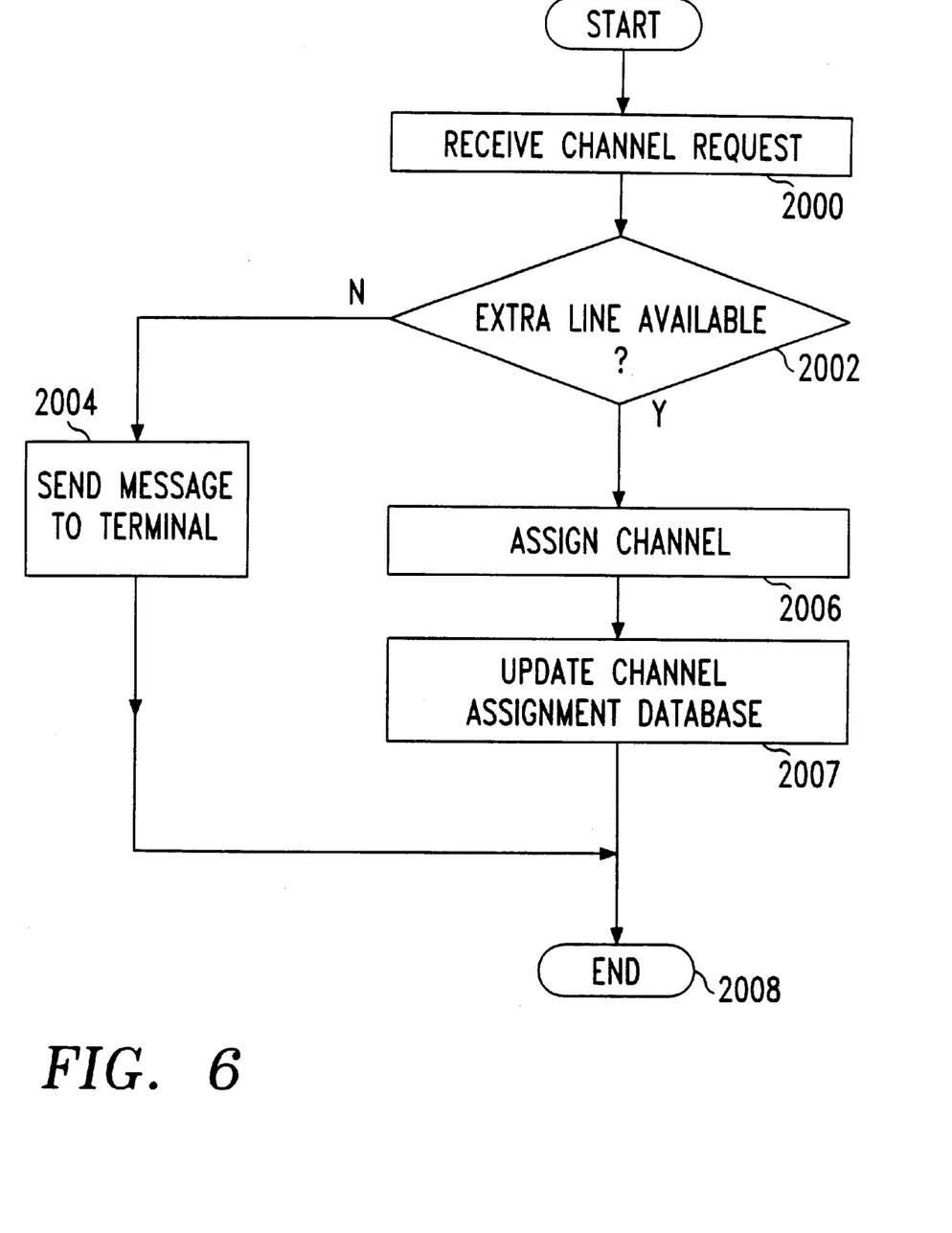
FIG. 6 is a flowchart of the network interface device process for outgoing calls.

FIG. 6 shows a flowchart of the NID 10 for outgoing calls for the single tap line configuration. In step 2000, the controller 70 receives a channel request from a terminal 40–44 and goes to step 2002. In 2002, the controller 70 determines whether an unassigned channel is available. If available, the controller 70 goes to step 2006; otherwise, the controller 70 goes to step 2004. In step 2004, the controller 70 sends a message to the requesting terminal 40–44 via the downstream control channel, for example, to indicate that the NID 10 is busy such as a busy signal, for example, and goes to step 2008 to end the process In step 2006, the controller 70 assigns the unassigned channel to the requesting terminal 40–44 and sends a message to the requesting terminal 40–44 indicating the channel number that the terminal 40–44 may use to make the call, and goes to step 2007. In step 2007, the controller 70 updates the channel assignment database so that all future communication data between the terminal 40–44 and the called party may be routed properly, and goes to step 2008 to end the process.

While the above assumes that the controller 70 responds to a channel request, the terminal interface 110 may also have this capability and performs a similar process as above. In this way, the controller 70 may be relieved of this processing load and be free to perform other call processing tasks.

Also, the process for processing a call request from a terminal 40–44 is similar for star configuration connected terminals 40–44. When a call request is received, the controller 70 need not allocate channels because each terminal 40–44 has a dedicated line. The terminal interface 110 merely receives the call request, via a switch for example, and forwards the call request to the controller 70. The controller 70 may send appropriate parameters to the terminal interface 110 and the network interface 90 to set up the call, i.e., routing set up, and the requesting terminal 40–44 may proceed with the call.

The NID 10 may retain records of the number of calls processed for billing purposes. For example, if for one month, the subscriber never had more than one call at any one time, then the subscriber may be billed at a lower rate than if 100 hours of call time consisting of concurrent calls of at least five terminals 40–44. Thus, the NID 10 may keep accurate records of the number of calls and the concurrency level occurring over appropriate time intervals. The NID 10 or other billing processes, such as record database 58 of the communication network 20, may process the records and generate a bill accordingly.

The various components of the NID 10 may be implemented by technology known to those skilled in the art. For example, the memory 100 may be implemented using RAM, EEPROM, etc. Also, application specific integrated circuits (ASIC) may be used for the controller 70, the mux-demux device 80, the network interface 90, or the terminal interface 110. Other well known hardware implementations such as PLA, PLD, etc. may also be used.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for provisioning an extra channel between a terminal and a network, comprising:
   receiving a channel request for an extra channel from a requesting terminal via an existing channel on a line between the requesting terminal and the network; and
   allocating the extra channel on the line based on the channel request, wherein an unassigned temporary telephone number is dynamically allocated to the extra channel, the temporary phone number being selected by the network.

2. A method according to claim 1, wherein the requested terminal is a network interface device, the network interface device having a plurality of devices connected therewith.

3. The method of claim 2, further comprising:
   demultiplexing calls received from the line;
   selecting one device of the devices to receive the call based on a profile;
   associating each of the calls with one of the devices based on a correspondence established by the selecting step; and
   transmitting each of the calls to the associated devices.

4. The method of claim 3, wherein the transmitting step comprises outputting each of the calls to an associated device on a line uniquely assigned to the associated device.

5. The method of claim 3, wherein the transmitting step comprises outputting each of the calls via an address of the device, the device being connected on a single line with other devices.

6. The method of claim 5, further comprising:
   establishing channels on the single line; and
   assigning one channel of the channels to the device when the device was first selected by the selecting step; and
   storing a channel assignment in a database.

7. The method of claim 5, further comprising:
   retrieving the channel assignment from the database;
   extracting from the channel assignment a channel number that corresponds to the device; and
   outputting the call to the device on a channel corresponding to the channel number.

8. The method of claim 3, wherein the profile includes entries corresponding to each of the devices, each of the entries including fields indicating at least one priority of each of the devices for receiving calls.

9. The method of claim 8, wherein the priority of each of the entries corresponds to a calling party telephone number, the selecting step selecting the device based on the priority of the device that corresponds to a telephone number of a calling party of the call.

10. The method of claim 9, wherein the profile is divided into a plurality of tables, each of the tables corresponding to a call type, the selecting step retrieving one of the tables that corresponds to a call type of the call that is received for selecting the device.

11. The method of claim 10, wherein the call type includes at least one of a voice call, facsimile call, and data network call.

12. The method of claim 2, further comprising:
    receiving a call request for an outgoing call from a device;
    allocating resources for routing the outgoing call; and
    connecting the outgoing call to the single telephone line.

13. The method of claim 12, further comprising:
    assigning an unassigned channel for the outgoing call;
    updating a channel assignment database; and
    routing the call based on the channel assignment.

14. The method of claim 12, wherein the allocating step comprises:
    generating parameters for routing the outgoing call; and
    routing the outgoing call based on the parameters.

15. The method of claim 6, wherein the channel assignment, the profile, and billing records are at least partially stored on both the database and a record database, the database and the record database being connected with the telephone network and able to communicate with the database all or a portion of the channel assignment, the profile, and the billing records.

16. A method for provisioning an extra channel, comprising:
    transmitting an incoming call to a called terminal;
    receiving a channel request for an extra channel from the called terminal; and
    establishing an extra channel on a line between the called terminal and the network, wherein an unassigned temporary telephone number is dynamically allocated to the extra channel, the temporary phone number being selected by the network.

17. The method according to claim 16, further comprising:
    transmitting the incoming calls on the extra channel to the called terminal.

18. The method according to claim 16, further comprising:
    removing the extra channel once the incoming call is terminated.

19. A method according to claim 16, wherein the requested terminal is a network interface device, the network interface device having a plurality of devices connected therewith.

20. The method of claim 19, further comprising:

demultiplexing calls received from the line;

selecting one device of the devices to receive the call based on a profile;

associating each of the calls with one of the devices based on a correspondence established by the selecting step; and transmitting each of the calls to the associated devices.

21. The method of claim 20, wherein the transmitting step comprises outputting each of the calls to an associated device on a line uniquely assigned to the associated device.

22. The method of claim 21, wherein the transmitting step comprises outputting each of the calls via an address of the device, the device being connected on a single line with other devices.

23. The method of claim 22, further comprising:

establishing channels on the single line; and assigning one channel of the channels to the device when the device was first selected by the selecting step; and storing a channel assignment in a database.

24. The method of claim 23, further comprising:

retrieving the channel assignment from the database;

extracting from the channel assignment a channel number that corresponds to the device; and outputting the call to the device on a channel corresponding to the channel number.

25. The method of claim 19, wherein the profile includes entries corresponding to each of the devices, each of the entries including fields indicating at least one priority of each of the devices for receiving calls.

26. The method of claim 25, wherein the priority of each of the entries corresponds to a calling party telephone number, the selecting step selecting the device based on the priority of the device that corresponds to a telephone number of a calling party of the call.

27. The method of claim 26, wherein the profile is divided into a plurality of tables, each of the tables corresponding to a call type, the selecting step retrieving one of the tables that corresponds to a call type of the call that is received for selecting the device.

28. The method of claim 27, wherein the call type includes at least one of a voice call, facsimile call, and data network call.

29. The method of claim 19, further comprising:

receiving a call request for an outgoing call from a device;

allocating resources for routing the outgoing call; and connecting the outgoing call to the single telephone line.

30. The method of claim 29, further comprising:

assigning an unassigned channel for the outgoing call;

updating a channel assignment database; and routing the call based on the channel assignment.

31. The method of claim 19, wherein the allocating step comprises:

generating parameters for routing the outgoing call; and routing the outgoing call based on the parameters.

32. The method of claim 6, wherein the channel assignment, the profile, and billing records are at least partially stored on both the database and a record database, the database and the record database being connected with the telephone network and able to communicate with the database all or a portion of the channel assignment, the profile, and the billing records.

33. A method for providing an extra line between a called terminal and a network, comprising:

receiving an incoming call for a called terminal;

transmitting an incoming call message to the called terminal;

receiving a request for an extra channel from the called terminal; and establishing an extra channel between the called terminal and the network, wherein an unassigned temporary telephone number is dynamically allocated to the extra channel, the temporary phone number being selected by the network.

34. A method according to claim 33, wherein the called terminal is a network interface device, the network interface device having a plurality of devices connected therewith.

35. The method of claim 34, wherein the profile includes entries corresponding to each of the devices, each of the entries including fields indicating at least one priority of each of the devices for receiving calls.

36. The method of claim 35, wherein the priority of each of the entries corresponds to a calling party telephone number, the selecting step selecting the device based on the priority of the device that corresponds to a telephone number of a calling party of the call.

37. The method of claim 36, wherein the profile is divided into a plurality of tables, each of the tables corresponding to a call type, the selecting step retrieving one of the tables that corresponds to a call type of the call that is received for selecting the device.

38. The method of claim 37, wherein the call type includes at least one of a voice call, facsimile call, and data network call.

* * * * *